Oct. 2, 1956

D. S. WEISS 2,765,091

SPARE WHEEL CARRIER

Filed Feb. 3, 1953

INVENTOR.
DEWEY  S.  WEISS
BY
*Buckhurn and Cheatham*

ATTORNEY

Oct. 2, 1956    D. S. WEISS    2,765,091
SPARE WHEEL CARRIER
Filed Feb. 3, 1953    2 Sheets-Sheet 2
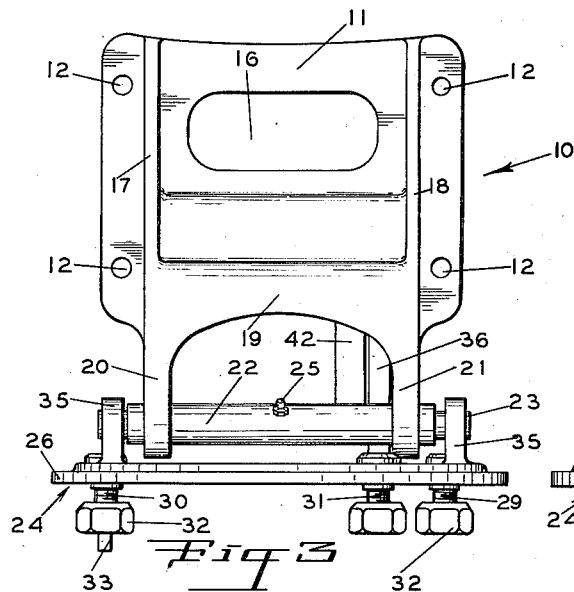
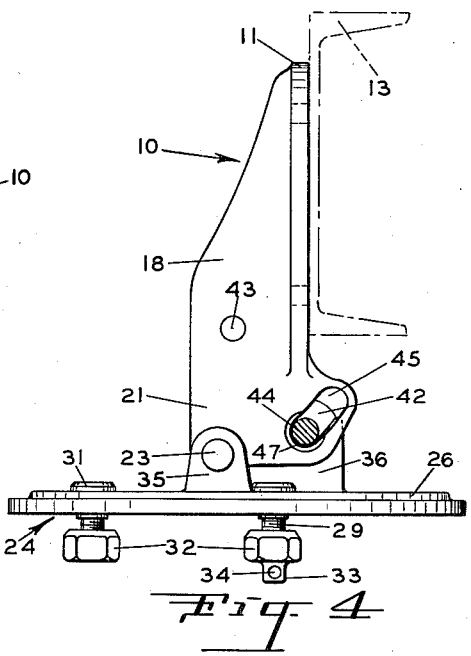
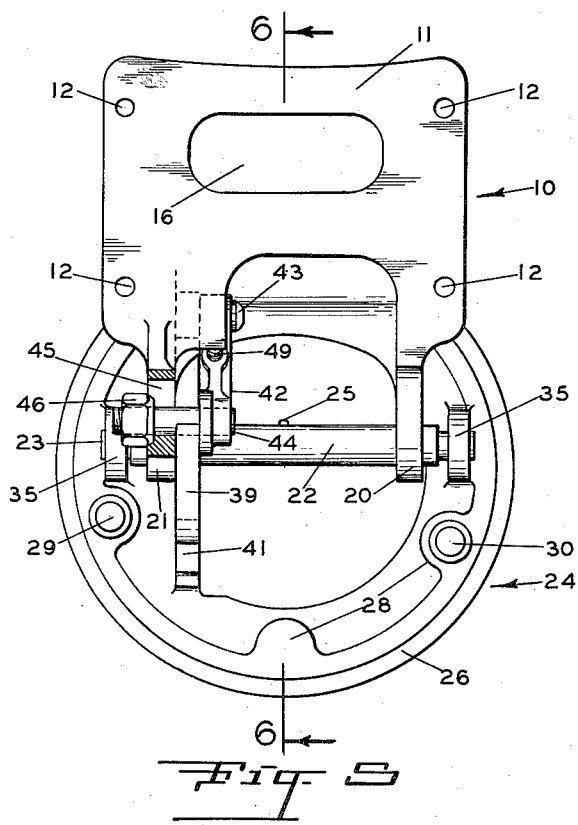
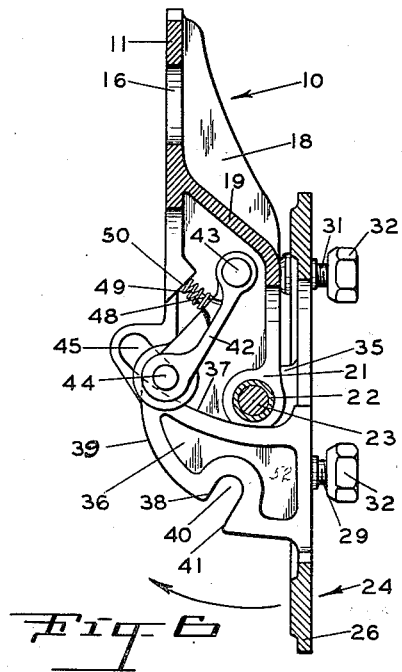
INVENTOR.
DEWEY S. WEISS.
BY
Buckhorn and Cheatham
ATTORNEY 0
United States Patent Office 2,765,091
Patented Oct. 2, 1956

2,765,091

SPARE WHEEL CARRIER

Dewey S. Weiss, Portland, Oreg.

Application February 3, 1953, Serial No. 334,859

5 Claims. (Cl. 214—454)

My invention comprises a spare wheel carrier for an automotive vehicle, and is particularly directed toward the transportation of spare wheels for heavy duty vehicles such as trucks, trailers and truck-tractors. The spare wheels for such vehicles, including the hub and pneumatic tire, are large, unwieldly and extremely heavy, and in some cases require the use of hoisting equipment, particularly when the spare wheel is mounted on the bed or cab of the vehicle. An object of the present invention is to eliminate the necessity for hoisting equipment by so mounting the spare wheel that it may be easily mounted and dismounted without the use of hoisting equipment. In the present invention the spare wheel is transported in a horizontal position beneath the bed of the vehicle upon a carrier including a wheel mounting plate which is movable from a horizontal position to a vertical position, the spare wheel being thus close to the ground so that the driver may manually move the spare wheel the short distance required to rest it on the ground and may then roll it to its position of use.

A further object of the present invention is to provide a device of the character described which is made of relatively few, sturdy parts which are easily manufactured and assembled, and which are not likely to become damaged in the rough usage to which such devices are subjected.

A further object of the present invention is to provide a device of the character described in which the wheel mount may be retained in either a horizontal position or an upright position, the device including easily manipulated latching means comprising a sturdy locking device to prevent displacement of the spare wheel during normal movements of the vehicle.

The foregoing objects and advantages will be more readily ascertained by inspection of the accompanying drawings taken in connection with the following specification wherein like numerals refer to like parts throughout.

In the drawings,

Fig. 3 is a front view of the present invention with the wheel mounting plate in horizontal position;

Fig. 4 is a side view of Fig. 3;

Fig. 5 is a rear view of the present invention with the wheel mounting plate in vertical position; and Fig. 6 is a vertical section taken substantially along line 6—6 of Fig. 5.

Figure 1:
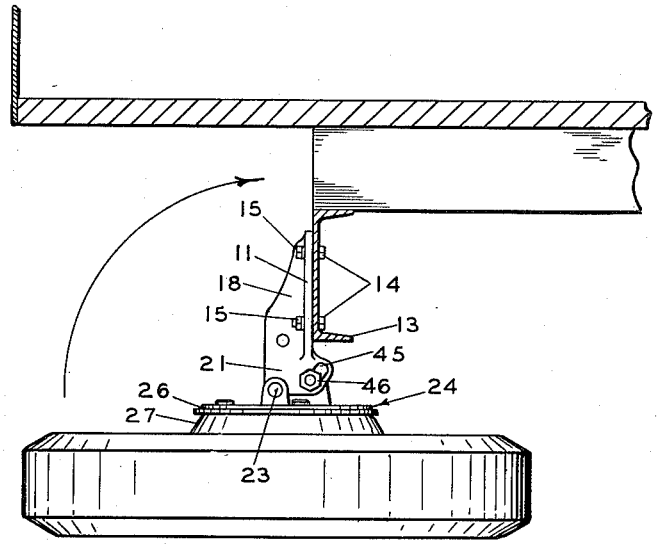
Fig. 1 is a vertical, transverse section through a portion of a vehicle showing a spare wheel mounted thereon by means of the present invention.
Figure 2:
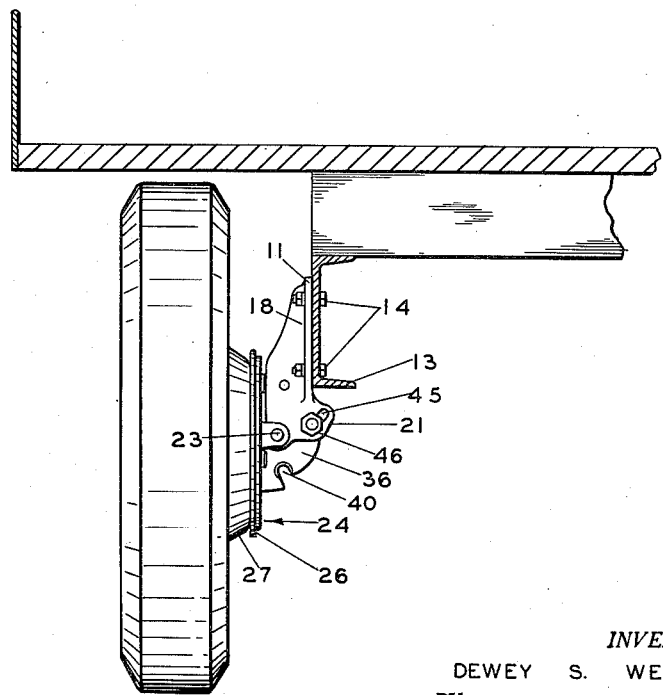
Fig. 2 is a view similar to Fig. 1 showing the spare wheel moved to a vertical position ready for dismounting.

The wheel carrier of the present invention comprises a bracket 10 including a base 11 having a plurality of openings 12 therethrough, the base having its rear face shaped to match the outer surface of a structural member of the vehicle such as the longitudinal frame member 13, and the openings 12 being provided for reception of bolts 14 adapted to be associated with nuts 15 for mounting the device on the vehicle. The base is provided with a hand hole opening 16 to facilitate handling of the wheel carrier when it is detached from the vehicle. The bracket comprises a pair of outwardly extending vertical flanges 17 and 18, intermediate portions of which are strengthened by a web 19 integral with the flanges and the base and extending outwardly and downwardly from a point below the hand hole opening 16 to an intermediate point of the outer edges of the flanges. The flanges extend downwardly below the base to provide a pair of extensions 20 and 21 which are provided with aligned openings for reception of a bearing sleeve 22 extending longitudinally of the vehicle in a horizontal position when the device is mounted on the vehicle. The bearing sleeve 22 is suitably affixed to the flanges as by tack welding, and the ends thereof extend beyond the outer surfaces of the extensions 20 and 21. The bearing sleeve supports a rotatable trunnion 23, the ends of which project beyond the ends of the bearing sleeve, the trunnion providing pivot means for pivotally mounting a wheel support generally indicated at 24, the construction being such that the wheel support may be swung from a generally horizontal position, as seen in Fig. 1, to a generally vertical position, as seen in Fig. 2. The pivot means is provided at the outer, lower corners of the extensions 20, 21 whereby the wheel support may be swung upwardly alongside of the outer edges of the flanges 17 and 18. The bearing sleeve 22 preferably mounts a grease nipple 25 in order that a lubricant may be forced into the space between the sleeve and the trunnion.

The wheel support preferably comprises an annular member 26 shaped to resemble the wheel mounting structure of the vehicle whereby the hub 27 of the spare wheel may be attached thereto. The member 26 is provided with a plurality of integral pads 28, a plurality of which are drilled for the reception of a plurality of wheel mounting studs 29, 30 and 31, it being sufficient for transporting a spare wheel that three such studs be provided. The studs are adapted for reception of standard wheel nuts 32 for demountably attaching the spare wheel to the support, and at least one of the studs is provided with an integral extension 33 provided with an opening 34 for reception of a locking device to prevent theft. It will be apparent from the foregoing that the nuts 32 are easily accessible from alongside the vehicle when the wheel is swung to an upright position, as seen in Fig. 2.

The member 26 is provided with a pair of integral, upwardly extending ears 35 through which the trunnion 23 is passed to mount the support on the base and to which the trunnion is suitably affixed to prevent disassembly, such as by tack welding. The ears are so positioned that the axis of the pivot means is displaced from a diameter of the support member 26, whereby the spare wheel naturally swings toward a vertical position, the direction of displacement being upwardly from the horizontal diameter when the wheel is vertical, as seen in Fig. 2.

The support member 26 is provided with an upwardly and outwardly extending integral keeper 36, the outer edge of which is shaped to provide an upper abutment surface 37 and a lower, oppositely facing abutment surface 38 between which there is provided an arcuate track 39. The lower abutment surface 38 forms one side of a notch 40 extending inwardly toward the trunnion 23, the lower surface 41 of the notch 40 being extended radially beyond the track to provide a means to limit swing movement, as will appear. The abutment surfaces 37 and 38 comprise portions of latching means to retain the support at either of its positions.

A latch comprising a lever 42 is mounted on the bracket, the mounting being accomplished by means of a shoulder rivet 43 affixed to the flange 18 and extending horizontally therefrom toward the flange 17, the rivet having a large head whereby the latch lever 42 is pivotally retained against disassembly. A wheel mounting stud 44 is fixed to the free end of the lever and has its threaded end extending horizontally therefrom through an arcuate slot 45 in the extension 21 inwardly from the trunnion 23. A standard wheel mounting nut 46 is engaged with the end of the stud, the conical, inner surface thereof being adapted to be seated in a countersink 47 at the lower end of the slot 45. The lever 42 carries a spring retainer pin 48 extending upwardly and inwardly toward the base 11 from an intermediate portion thereof, and a spiral spring 49 retained by the pin 48 is compressed between the lever and a thrust surface 50 on the base. The construction is such that the spring 49 urges the latch lever 42 toward the trunnion 23, whereby the natural tendency of the construction is for the stem of the stud 44 to engage the abutment surfaces 37 and 38 when the wheel support is swung to either limit of movement. Swinging movement of the wheel support is limited in one direction by the head of the stud 31 engaging the flange 18, as seen in Fig. 6, and swinging movement toward the horizontal position is limited by the stem of the stud 44 engaging the limiting surface 41. The movement is permitted when the nut 46 is loosened until the inner surface thereof clears the adjacent surface of the extension 21. The latching means may be locked in carrying condition when the support is horizontal by tightening the nut 46 into the countersink 47. As seen in Fig. 1, the nut 46 is easily accessible when the wheel is horizontal, and all that is required is to loosen the nut and push inwardly thereon, whereupon the wheel will naturally swing toward the vertical position and cause the stem of stud 44 to engage the track 39. The operator may push upon the wheel to cause it to assume the final vertical position, whereupon the spring 49 will snap the latch into latching engagement with the abutment surface 37. After the wheel has been replaced it is a simple matter to reach around the wheel and push rearwardly on the nut 46 while pulling downwardly on the top of the wheel. The latch stud 44 will automatically move into latching engagement with the abutment surface 38, whereupon the nut 46 may be tightened.

The free end of the lever 42 is enlarged to provide a relatively large, disclike pad 51 surrounding the stem of the stud 44, and the notch 40 is bordered by a flat, raised surface indicated at 52 of substantially the same diameter as the pad 51, whereby large, flat surfaces on the keeper and the lever may be brought into frictional engagement with each other when the nut 46 is tightened. The surface of the keeper 36 on the reverse side thereof adjacent the notch 40 is parallel to the surface 52, and a large, flat surface adjacent the lower end of the slot 45 on the extension 21 may be brought into firm, frictional engagement therewith when the nut 46 is tightened. By reason of this construction the spare wheel support is firmly clamped against relative movement with respect to the bracket 10 when the vehicle is in motion, rattling or other relative movement being prevented by the bringing together of large, vertical surfaces maintained in tight frictional engagement with each other, rather than relying solely upon the stem of stud 44 fitting the notch 40 and the conical end of the nut 46 engaging the countersink 47. Applicant's device will therefore have an extremely long life, as distinguished from a carrier in which relative movement of the parts might be permitted, which would result in failure due to pounding of the stem of the stud 44 out of round where it engages the notch 40, or pounding of the trunnion 23 out of round where it engages the ears 35.

It is to be noted that the use of the three rigidly mounted studs 29, 30 and 31 in the manner illustrated, with two of the studs 29 and 31 at one side of the vertical centerline when the support is upright and the other stud 30 being alone at the opposite side of the construction and below the extension 20, has a distinct utility. By reason of this construction the driver may handle a spare wheel weighing several times more than he would be able to lift unaided from the ground. The spare wheel may be rolled alongside of the support when it is latched in vertical position and the stud 30 engaged in one of the stud receiving openings in the hub 27 near the top of the hub, the nut for stud 30 being then loosely engaged to prevent accidents. The spare wheel may then be swung into position by grasping the tire on the side away from the engaged stud and swinging the spare wheel about the engaged stud as a fulcrum point until the studs 29 and 31 may be engaged in the corresponding openings in the hub, the construction thus giving the operator a mechanical advantage in lifting the spare wheel. The same operation is reversed when lowering the wheel to the ground. Of course, it is to be appreciated that the operator may place a wedge-shaped block on the ground and roll the spare wheel into position thereon adjacent the support, but the arrangement of the studs fixed to the support in the manner described eliminates any necessity for such a block.

Having illustrated and described a preferred form of the present invention, it should be apparent to those skilled in the art that the same permits of modification in arrangement and detail. I claim as my invention all such modifications as come within the true spirit and scope of the appended claims.

I claim:

1. A spare wheel carrier for a vehicle comprising a bracket adapted to be affixed to the vehicle, horizontal pivot means mounted on said bracket, a wheel support pivotally mounted on said pivot means for swinging movement from a generally horizontal position beneath said bracket to a generally vertical position alongside said bracket, said wheel support comprising a disc-shaped member adapted to be concentrically disposed with respect to the wheel and in face-to-face contact with the hub thereof and said horizontal pivot means being upwardly disposed from the horizontal diameter of said wheel support when in vertical position, and means to retain said support at either of said positions comprising a keeper on said wheel support defining a pair of oppositely facing abutments and a pivoted latch mounted on said bracket and engageable with said abutments, said latch comprising a threaded member and said bracket comprising a portion defining an arcuate slot through which said threaded member extends, and said latch comprising a nut threadedly engaged on said threaded member and adapted to be tightened to lock said latch in latching position.

2. A spare wheel carrier for a vehicle comprising a bracket adapted to be affixed to the vehicle, horizontal pivot means mounted on said bracket, a wheel support pivotally mounted on said pivot means for swinging movement from a generally horizontal position beneath said bracket to a generally vertical position alongside said bracket, said wheel support comprising a disc-shaped member adapted to be concentrically disposed with respect to the wheel and in face-to-face contact with the hub thereof and said horizontal pivot means being upwardly disposed from the horizontal diameter of said wheel support when in vertical position, and means to retain said support at either of said positions comprising a keeper on said wheel support defining a pair of oppositely facing abutmnts and a pivoted latch mounted on said bracket and engageable with said abutments, said latch comprising a threaded member and said bracket comprising a portion defining a slot through which said threaded member extends, and said latch comprising a nut threadedly engaged on said threaded member and adapted to be tightened to lock said latch in latching position, said slot having a countersink adjacent one end and said nut having a conical surface adapted to be seated in said countersink to prevent accidental displacement of said latch.

3. A spare wheel carrier for a vehicle comprising a bracket adapted to be affixed to the vehicle, horizontal pivot means mounted on said bracket, a wheel support pivotally mounted on said pivot means for swinging movement from a generally horizontal position beneath said bracket to a generally vertical position alongside said bracket, said wheel support comprising a disc-shaped member adapted to be concentrically disposed with respect to the wheel and in face-to-face contact with the hub thereof and said horizontal pivot means being upwardly disposed from the horizontal diameter of said wheel support when in vertical position, and means to retain said support at either of said positions comprising a keeper on said wheel support defining a pair of oppositely facing abutments and a pivoted latch mounted on said bracket and engageable with said abutments, said latch comprising a threaded member and said bracket comprising a portion defining a slot through which said threaded member extends, and said latch comprising a nut threadedly engaged on said threaded member and adapted to be tightened to lock said latch in latching position, said slot having a countersink adjacent one end and said nut having a conical surface adapted to be seated in said countersink to prevent accidental displacement of said latch, said keeper having parallel plane surfaces on opposite sides adjacent the one of said abutments engaged by said latch when the support is horizontal, said latch comprising a plane surface of large extent parallel with and engageable with one of said surfaces on the keeper, and said bracket having a large, plane surface parallel with and engageable with the other of said surfaces on the keeper, said surfaces preventing relative movement of said support with respect to said bracket when said nut is tightened into said countersink.

4. A spare wheel carrier for a vehicle comprising a bracket adapted to be affixed to the vehicle, horizontal pivot means mounted on said bracket, a wheel support pivotally mounted on said pivot means for swinging movement from a generally horizontal position beneath said bracket to a generally vertical position alongside said bracket, and means to retain said support at either of said positions, said support comprising a plurality of studs projecting therefrom and adapted to engage the mounting openings in the hub of a spare wheel, there being one stud only at one side of the vertical centerline of said wheel support when in vertical position, said wheel support lying entirely behind a plane passing through the inner ends of said studs when said wheel support is in its vertical position alongside said bracket whereby said one stud may be engaged in an upper, mounting opening in the hub of a spare wheel vertically positioned alongside said support and used as a fulcrum about which to lift said spare wheel whereby the remainder of said studs may be engaged in other mounting openings in the hub of the wheel.

5. A spare wheel carrier for a vehicle comprising a bracket adapted to be affixed to the vehicle, horizontal pivot means mounted on said bracket, a wheel support pivotally mounted on said pivot means for swinging movement from a generally horizontal position beneath said bracket to a generally vertical position alongside said bracket, and means to retain said support at either of said positions, said support comprising a plurality of studs projecting therefrom and adapted to engage mounting openings in the hub of a spare wheel, there being one stud only at one side of the vertical centerline of said wheel support when in vertical position, said one stud being below the horizontal centerline of said wheel support when in vertical position, said wheel support lying entirely behind a plane passing through the inner ends of said studs when said wheel support is in its vertical position alongside said bracket whereby said one stud may be engaged in an upper, mounting opening in the hub of a spare wheel vertically positioned alongside said support and used as a fulcrum about which to lift said spare wheel whereby the remainder of said studs may be engaged in other mounting openings in the hub of the wheel.

References Cited in the file of this patent
UNITED STATES PATENTS

| | | |
|---|---|---|
| Re. 22,928 | Sargent et al. | Oct. 14, 1947 |
| 1,866,013 | Coquille | July 5, 1932 |
| 2,049,681 | Arndt | Aug. 4, 1936 |
| 2,383,476 | Falslev et al. | Aug. 28, 1945 |
| 2,399,207 | Clark | Apr. 30, 1946 |